3,059,000
16α-FLUORO-4-ANDROSTEN-17α-OL-3-ONE
AND ESTERS THEREOF
Edward J. Becker, Princeton, and Paul P. Lemanski, Nixon, N.J., assignors to Olin Mathieson Chemical Corporation, New York, N.Y., a corporation of Virginia
No Drawing. Filed Sept. 1, 1961, Ser. No. 135,469
4 Claims. (Cl. 260—397.4)

This invention relates to, and has for its object the provision of new steroids and more particularly to the new steroids 16α-fluoro-4-androsten-17α-ol-3-one and 17-esters thereof.

The new steroid of this invention, 16α-fluoro-4-androsten-17α-ol-3-one is prepared by reducing 16α-fluoroandrostenedione by treatment with sodium borohydride, whereby a mixture of 16α-fluoro-4-androsten-17α-ol-3-one and 16α-fluoro-testosterone are obtained and separating the mixture to yield pure 16α-fluoro-4-androsten-17α-ol-3-one. To prepare the esters of this invention, 16α-fluoro-4-androsten-17α-ol-3-one, either alone or in mixture with 16α-fluorotestosterone, is reacted with the desired acylating agent. If a mixture is used, the resulting mixture can then be separated chromatographically to yield the desired ester of 16α-fluoro-4-androsten-17α-ol-3-one.

Although any acylating agent may be used, the preferred compounds are the acyl halides and acid anhydrides of hydrocarbon carboxylic acids of less than ten carbon atoms, such as the acyl chlorides and acid anhydrides of lower alkanoic acids (e.g., acetic, propionic, butyric, enanthic and hexanoic acid), lower alkenoic acids, cycloalkanecarboxylic acids, cycloalkenecarboxylic acids, monocyclic aromatic carboxylic acids (e.g., benzoic and p-toluic acid), and monocyclic aralkanoic acids (e.g., phenacetic, β-phenylpropionic and β-phenylbutyric acid). The acylating reaction is preferably conducted in the presence of a base, such as pyridine.

16α - fluoro - 4 - androsten - 17α - ol - 3 - one (and its esters), unlike the epimeric 16α-fluorotestosterone, is devoid of androgenic activity and possesses myotrophic activity. Hence, the compounds of this invention, unlike their epimers, can be used to decrease the required dose of androgenic steroids, such as testosterone, in the treatment of protein depletion states, being formulated for such administration in the same type of preparations as 17α-ethyl-19-nortestosterone, for example, with concentration and/or dosage based on the activity of the particular compound.

The following examples illustrate the invention (all temperatures being in centigrade):

EXAMPLE 1

*16α-Fluoro-4-Androsten-17α-Ol-3-One*

177.6 g. of 16α-fluoroandrostenedione is dissolved in 7.88 l. of methanol and cooled to 3°. During 15 minutes, 8.417 g. of sodium borohydride is added and the solution is maintained at 0–5° for one and one-quarter hours. Ice is then added to the solution, followed by 490 ml. of 1 N HCl. After one hour, the solution and crystals are poured into 24 l. of ice water. The product is filtered and dried overnight in vacuum to give about 134 g. of a mixture of 16α-fluoro-4-androsten-17α-ol-3-one and 16α-fluorotestosterone. 132 g. of this mixture is dissolved in 863 ml. of anhydrous pyridine and 278 ml. of propionic anhydride is then added, while swirling the solution. After 17 hours at room temperature the solution is diluted with ice and 4000 ml. of 10% sulfuric acid. The product is isolated by chloroform extraction (3×1.4 l.). After washing and drying, the organic phase is evaporated to a crystalline residue, weighing about 168 g. Recrystallization from acetone/hexane gives about 57.5 g., M.P. about 200–209° and a second crop of 6.3 g. Both crops are combined and recrystallized from acetone/water to give about 58.1 g. of 16α-fluorotestosterone propionate. Paper chromatography demonstrates that the motor liquor contains two substances. This mother liquor is chromatographed on alumina. No crystalline material is obtained but benzene/hexane 50:1, benzene and benzene/chloroform 25:1, 25:3, 25:6 and 3:1 provides a uniform substance, as indicated by paper chromatography. A sample of these fractions (971 mg.) is saponified in aqueous sodium carbonate. After extraction into chloroform and treatment with water followed by sodium sulfate the solution is evaporated to a crystalline mass. Recrystallization from acetone/hexane gives about 485 mg. of 16α-fluoro-4-androstene-17α-ol-3-one, M.P. about 183–185°. A second recrystallization brings the melting point to about 185–188°, $[\alpha]_D^{22}$ +50°, 18.56 mg./2 ml. chloroform.

EXAMPLE 2

*16α-Fluoro-4-Androsten-17α-Ol-3-One Acetate*

132 mg. of 16α-fluoro-4-androsten-17α-ol-3-one is dissolved in 3 ml. of anhydrous pyridine and 3 ml. of acetic anhydride is then added, while swirling the solution. After 18 hours at room temperature, the solution is diluted with ice and 15 ml. of 10% sulfuric acid. The product is isolated by chloroform extraction and evaporation of the chloroform.

Similarly, by substituting other acylating agents for the acetic anhydride in the procedure of Example 2, the corresponding esters of 16α-fluoro-4-androsten-17α-ol-3-one are obtained.

The invention may be variously otherwise embodied within the scope of the appended claims.

What is claimed is:
1. A compound selected from the group consisting of 16α-fluoro-4-androsten-17α-ol-3-one and esters thereof with hydrocarbon carboxylic acids of less than ten carbon atoms.
2. 16α-fluoro-4-androsten-17α-ol-3-one.
3. 16α-fluoro-4-androsten-17α-ol-3-one acetate.
4. 16α-fluoro-4-androsten-17α-ol-3-one propionate.

References Cited in the file of this patent
UNITED STATES PATENTS
2,857,403   Fried et al. _____ Oct. 21, 1958